April 18, 1967
L. H. HAHN
3,314,762
BROMINE PURIFICATION PROCESS
Filed Aug. 3, 1964
2 Sheets-Sheet 2
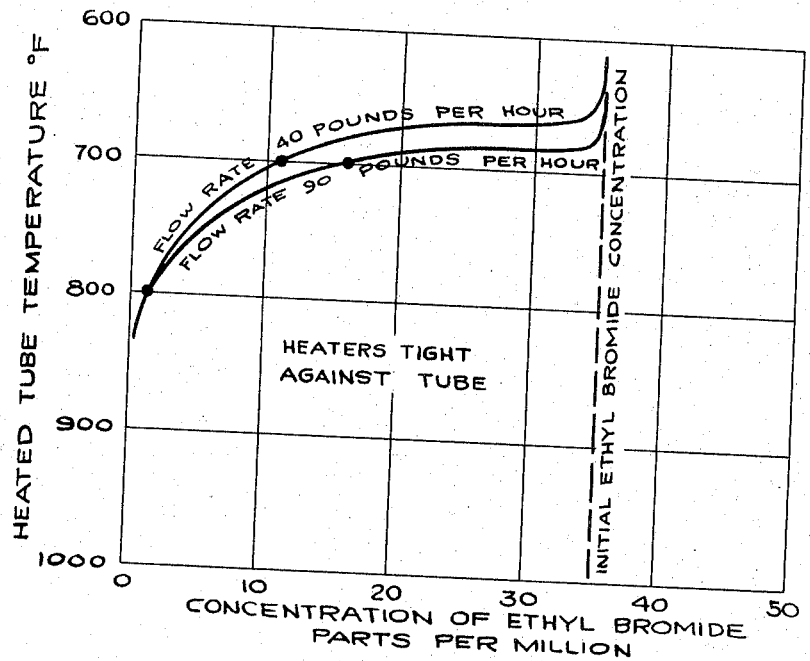
FIG. II
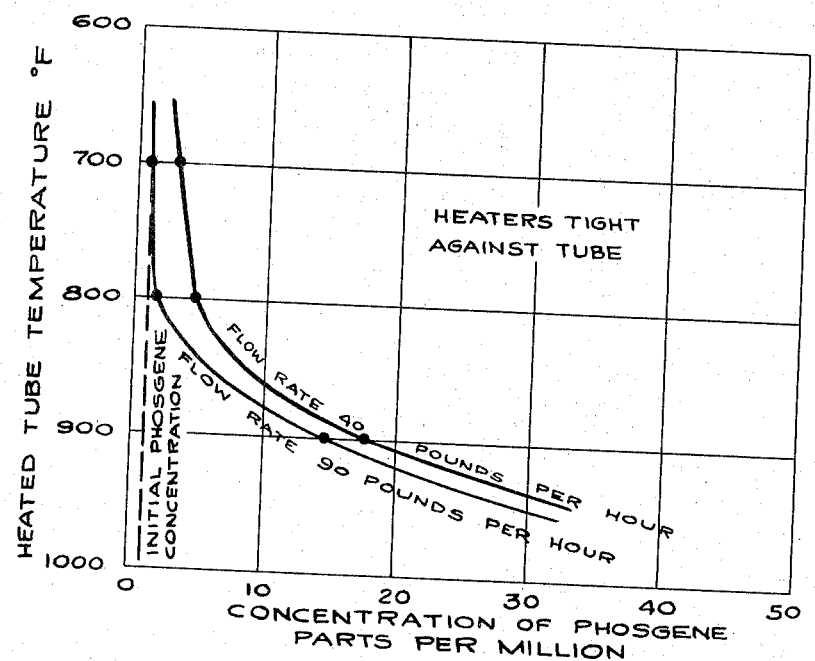
FIG. III
INVENTOR.
LYNN H. HAHN
BY
*Miller Morris & Pappas*
ATTORNEYS

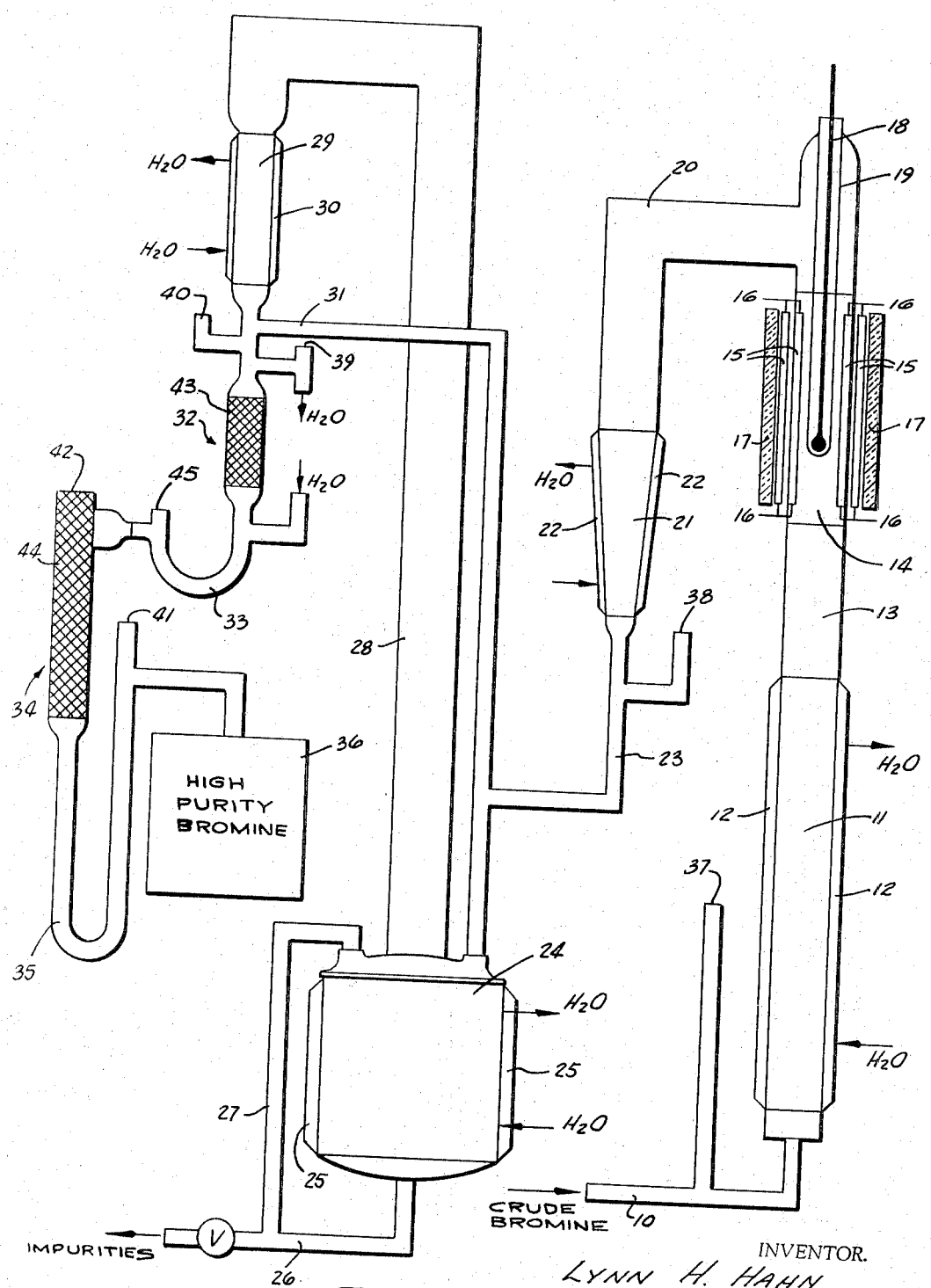
FIG. I
INVENTOR.
LYNN H. HAHN

United States Patent Office 3,314,762
Patented Apr. 18, 1967

3,314,762
BROMINE PURIFICATION PROCESS
Lynn H. Hahn, Alma, Mich., assignor to Michigan Chemical Corporation, St. Louis, Mich., a corporation of Michigan
Filed Aug. 3, 1964, Ser. No. 386,877
5 Claims. (Cl. 23—218)

This invention relates to a novel process for the preparation of high purity bromine and more particularly to a process for the preparation of high purity bromine whereby hydrocarbon and chlorine impurities are substantially removed from bromine containing these impurities.

Commercial quantities of bromine are obtained from brine which is drawn from underground wells. The brine can then be and usually is filtered to remove solid impurities. The brine is then heated and sent down the top of a reaction tower. A countercurrent of a mixture of chlorine and steam is passed up from the bottom of the tower so that a reaction between the brine and chlorine is initiated. The chlorine reacts with the bromides present in the brine to form bromine and chlorides. The bromine is then removed from the top of the tower as a gas along with the steam which is then condensed to remove it from the bromine. The bromine is then condensed. The bromine thus produced, which contains small amounts of hydrocarbon impurities and chlorine, is then passed through a chlorine separator and most of the chlorine is evaporated from the bromine. The bromine is then distilled to remove the bulk of the impurities which were carried over from the brine and introduced during the production of the bromine and dried with a sulfuric acid dryer.

While distillation removes the bulk of the impurities from the bromine, there are a considerable number of impurities which cannot be completely removed by distillation alone. These impurities include water, hydrogen chloride, carbon dioxide, ethyl bromide, dibromobenzene, phosgene, carbon tetrachloride, chloroform, bromotrichloromethane, chlorine, bromine-chloride, sulfuric acid, and unidentified hydrocarbon (C-H bonds) impurities. At the present time, there is a demand for high purity bromine, which is defined to mean bromine with a 99.95 percent plus purity. Bromine purified only by distillation does not come within the specifications for such high purity bromine.

Th prior art has utilized various processes for the purification of bromine. Thus, United States Pat. No. 2,929,686 discloses a process wherein crude bromine is heated by being passed through a heated tube, to a temperature of 1000° C. (1832° F.) in a continuous process. Oxygen is introduced into the crude bromine stream and hydrocarbon impurities in the bromine are oxidized to carbon dioxide. The bromide containing the reaction products, including carbon dioxide, is then passed through an ice trap. The bromine is solidified in the ice trap and is thus removed from the carbon dioxide which remains gaseous. The bromine is then passed through a sulfuric acid dryer in a conventional drying operation to remove the water which was formed as a result of the oxidation of the hydrocarbon impurities and which was also present in the original crude bromine.

There are a number of disadvantages to the purification process disclosed in Pat. No. 2,929,686. A principal disadvantage is that high purity bromine, as above defined, is not produced, primarily because chlorine which is a mapor impurity in crude bromine is not removed. Further, the temperatures required for the oxidation of the hydrocarbons are extremely high, thus making the practical operation of the process difficult and expensive. Further still, the use of oxygen in the process creates a fire hazard because of possible explosive combinations with various materials in the system.

Another process for the purification of bromine is disclosed in British Pat. No. 652,460. In this process, various adsorbent materials are used to remove impurities from crude bromine. A disadvantage of the process disclosed in this patent is that the adsorbent materials tend to agglomerate into a solid mass thereby reducing the effective adsorbent surface for removing impurities. Further, the agglomeration of the adsorbent materials reduces the flow rate of the bromine in filtration equipment. Thus, the process disclosed in this patent is time-consuming and expensive and is not considered useful for the large scale production of high purity bromine.

Other means for the preparation of high purity bromine have been examined, such as improved distillation and chlorine separation techniques in the conventional process for the preparation of bromine from brine, and all have been found to be unacceptable for practical and/or economic reasons. Thus, there is a need for an effective and economical process for the preparation of high purity bromine.

Therefore, it is an object of the present invention to provide a novel process for the preparation of high purity bromine which substantially removes hydrocarbon and chlorine impurities.

Further, it is an object of the present invention to provide a process for the preparation of high purity bromine which is effective and economical.

These and other objects will become increasingly apparent to those skilled in the art as the description proceeds and by reference to the drawings.

In the drawings:

FIGURE I is a schematic front view of the preferred equipment used in the preparation of high purity bromine according to the process of the present invention and particularly illustrating a heated tube through which crude or impure bromine is continuously passed.

FIGURE II is a graph showing the temperature of the heated tube shown in FIGURE I versus the concentration of the impurity ethyl bromide in the bromine after being passed through the heated tube under various operating conditions.

FIGURE III is a graph showing the temperature of the heated tube shown in FIGURE I versus the concentration of phosgene, a typical impurity generated in relatively large amounts by too high a temperature in the heated tube in the bromine after being passed through the heated tube under various operating conditions.

The objects of the present invention are accomplished by providing a novel process for the preparation of high purity bromine which comprises heating bromine containing hydrocarbon materials at that temperature which causes the hydrocarbon materials to react with the bromine, thereby substantially eliminating hydrocarbon materials and producing brominated carbon materials; and separating the thus produced materials from the bromine to produce high purity bromine. The preferred temperature range is 700° F. to 1000° F. It is particularly preferred to heat the crude bromine continuously by passing it across a heated surface, especially through a heated tube which may or may not contain a packing material, in producing the high purity bromine by the process of the present invention.

Crude bromine (distilled only) contains varying amounts of chlorine and hydrocarbon impurities depending upon the brine source from which it was obtained and the equipment used in the preparation of the bromine. Illustrative of the concentration of major impurities in crude (distilled) bromine from two separate sources is the data set forth in Table I.

TABLE I

| Source | Chlorine, p.p.m. | Water p.p.m. | Organics p.p.m. | Sulfuric Acid, | Assay Percent Bromine |
|---|---|---|---|---|---|
| 1 | 700 | 30 | 5 | 5 | 99.93 |
| 2 | 1,300 | 30 | 1,000 | 5 | 99.74 |

In general, crude (distilled) bromine contains between about 0.05 to 0.1 weight percent (500–1000 p.p.m.) of chlorine. The amount of chlorine in the crude bromine is in general directly related to the efficiency of the chlorine separators conventionally used but there is a residual amount of chlorine which is not removed by the chlorine separators.

The hydrocarbon impurities in crude bromine generally range between 0.0005 to 0.1 weight percent (5–1000 p.p.m.) with the higher concentration being the most common. In general, these are low boiling hydrocarbon impurities which are not removed by the distillation step and which have vapor pressures similar to bromine.

In the process of the present invention bromine containing hydrocarbon and chlorine impurities is heated. As a result of this heating, the hydrocarbon impurities react with the chlorine present as an impurity and/or the bromine to produce high molecular weight, high boiling impurities which have vapor pressures much lower than bromine. These high boiling impurities are then easily removed from the bromine, such as by distillation. The reaction of bromine or chlorine with the hydrocarbon impurities also produces hydrogen bromide or hydrogen chloride. Most of the hydrogen bromide produced then reacts with the chlorine impurity in the system to produce hydrogen chloride in bromine. The hydrogen chloride then is separated from the bromine in the conventional manner, usually by using a water scrubber.

It has been found that the bromine should be heated between a temperature of about 70° F. to about 1000° F. If a temperautre of less than about 700° F. is utilized, the hydrocarbon impurities will not be chlorinated and/or brominated. If a temperature in excess of about 1000° F. is utilized, it has been found that the hydrocarbon impurities are over heated and that considerable amounts of phosgene and/or carbonyl bromide are generated. These carbonyl halides are removed with difficulty. It was further found that the reaction of the bromine and/or chlorine with the hydrocarbon impurities to produce hydrogen bromide or hydrogen chloride is greatly reduced at temperatures in excess of about 1000° F., probably because of a competing reaction to form the carbonyl bromide and/or phosgene. Since the hydrogen bromide generation is essential to the removal of the chlorine impurity in the process of the present invention, temperatures in excess of about 1000° F. are to be avoided for this further reason.

Having generally described the process of the present invention, the following is a specific description in Examples I and II illustrative of the process of the present invention for the preparation of high purity bromine.

EXAMPLE I

In this example, a batch type process was conducted. A 500 ml. two neck flask was fitted with a condenser on one neck. A receiver was provided at the outlet end of the condenser. The flask necks were about five inches long. A Chromel wire was coiled and then the coil was passed in one neck of the flask and out the other neck to form a loop inside the flask. Electrical contacts from a Variac for heating were attached to each end of the wire. A heating mantle was placed under the flask.

About 50 ml. of crude bromine was charged dropwise to the flask through the open neck with the heating mantle regulated to a temperature of about 800° F. Bromine immediately began to reflux and to pass to the condenser and from there into the receiver. Most of the bromine charged into the flask went over to the receiver.

The bromine from the receiver was analyzed by infrared absorption and it was found that there were no hydrocarbons, phosgene or carbonyl bromine present in the product. The product was easily distilled to produce high purity bromine (99.99 percent purity) which contained only traces of brominated and chlorinated carbon compounds and which was substantially free from hydrocarbon impurities.

While the batch process of Example I was satisfactory, it was found that the process of the present invention was extremely efficient and suitable to large scale operations when conducted on a continuous basis by passing crude bromine over a heated surface, preferably through a heated tube, whereby the crude bromine was heated. Illustrative of the continuous process of the present invention is the following Example II.

EXAMPLE II

The equipment shown in FIGURE I was used. In general, the surfaces to be exposed to bromine were made of Pyrex glass because of the highly corrosive nature of bromine. The pipes were made of Pyrex tubing.

Crude bromine was introduced at the bottom 10 of a vertically positioned glass lined steel vaporizer 11 which was heated by circulating hot water through a jacket 12 on the vaporizer 11. The crude bromine was vaporized by the vaporizer 11 and introduced, after passing through a vertically positioned tube 13, to a vertically positioned heated quartz (Vycor) tube 14.

The tube 14 was heated by six heating rods 15 (four shown in FIGURE I) equally spaced around the tube 14. Current was supplied to the rods 15 through leads 16 and an external electrical heating circuit (not shown). The rods 15 and tube 14 were surrounded by a magnesia insulating material 17 (shown in front section in FIGURE I). A thermometer 18 was positioned in about the center of the tube 14 in a thermometer well 19, in order to determine the temperature of the bromine.

The gaseous bromine from the tube 14 then passed through a tube 20 down through a condenser 21 which was cooled by water passing through a jacket 22 and again liquified. The bromine was then passed through tube 23 to a receiver 24.

The receiver 24 was used to distill the bromine to remove the impurities produced as a result of the heating in the tube 14. The impurities remained in the receiver 24 and were withdrawn through a valved outlet 26, provided with a sight glass 27 for determining the liquid level in the receiver 24. The bromine in the receiver 24 was vaporized using a hot water jacket 25 on the receiver 24. The gaseous bromine was then passed through a tube 28 to a condenser 29 and liquified. The condenser 29 was provided with a jacket 30 supplied by cold water. After the condenser 29 an overflow return line 31 was provided leading back to the receiver 24.

The liquid bromine was then passed as droplets through a countercurrent water scrubber 32 packed with ceramic saddles 43 to remove hydrogen halides, essentially hydrogen chloride and hydrogen bromide. The liquid bromine was then passed through a tube 33 to a conventional sulfuric acid dryer 34 packed with ceramic saddles 44 and then through a tube 35 to a receiver 36. The sulfuric acid dryer 34 was open at the top 42 so that fresh sulfuric acid could be added periodically and the sulfuric acid was externally concurrently recirculated from the bottom to the top of the dryer 34 (not shown in FIGURE I). The bromine in the receiver 36 was high purity bromine.

Vents 37, 38, 39, 40 and 45 were provided throughout the system to maintain atmospheric pressures in the system. The vents 37, 38, 39, 40 and 45 were provided at points in the system where the bromine was liquid and lead to a common chamber (not shown) venting to the air. The vent 41 was provided with a drying tube (not shown) to prevent moisture from the air from entering the bromine in the receiver 36.

The heated tube 14 measured three inches in diameter by 36 inches long and had an effective heating surface 22 inches long. It was found that the effective heating surface had a considerable bearing on the effective flow rate through the heated tube 14, as will be discussed more fully hereinafter.

The heating rods 15 were in general positioned about one quarter inch from the tube 14. It was found that when the rods 14 were positioned closer to the tube 14 that greater amounts of phosgene and carbonyl bromide were generated at the same temperatures. This was believed to be due to excessive heating at the inside surface of the tube 14 due to the increased rate of heat transfer with the closer spacing. It was thus preferred to mount the rods 15 slightly away from the tube 14.

The equipment was operated to provide data on the effect of various temperatures and bromine flow rates through the tube 14, with various heating rod 15 spacings and with and without packing materials in the heated tube 14. The efficiency of the heated tube 14 was determined by measuring the concentration of ethyl bromide and phosgene in the product from the heated tube 14 by infrared absorption analysis. As indicated above, if difficultly removed hydrocarbons such as ethyl bromide were present, this was taken as an indication of incomplete heating of the bromine. If carbonyl halides, such as phosgene, were present in relatively large amounts, this was taken as an indication that there was too much heating of the bromine.

The results of various operating conditions are set forth in Table II and in FIGURES II and III, wherein the heated tube 14 was packed with ½-inch by ¾-inch silica chips. The initial concentration of ethyl bromide in the crude bromine was about 35 parts per million (p.p.m.) and of phosgene 1 p.p.m.

TABLE II

| Temp., °F. | Bromine rate (pounds/hr.) | Concentrations (p.p.m.) | | Heater Spacing |
|---|---|---|---|---|
| | | Ethyl Bromide | Phosgene | |
| 700 | 40 | 11 | 4 | Heaters tight against tube. |
| 800 | 40 | 1 | 5 | Do. |
| 900 | 40 | 0 | 18 | Do. |
| 700 | 90 | 16 | 1 | Do. |
| 800 | 90 | 1 | 2 | Do. |
| 900 | 90 | 0 | 15 | Do. |
| 800 | 90 | 0 | 2 | Heaters ¼" to ⅜" from tube. |
| 880 | 90 | 0 | 1 | Do. |
| 840 | 84 | 0 | 17 | Do. |
| 890 | 84 | 0 | 20 | Do. |
| 765 | 84 | 0 | 12 | Do. |
| 745 | 84 | 0 | 5 | Do. |
| 755 | 84 | 0 | 5 | Do. |
| 740 | 84 | 0 | 2 | Do. |
| 700 | 84 | 0 | 4 | Do. |
| 745 | 84 | 0 | 22 | Do. |

As can be seen from Table II and FIGURE II, the concentration of ethyl bromide is markedly reduced at temperatures between about 700° F. to 1000° F. (FIGURE II shows the graphs of the data with the heaters 15 tight against the tube 14). It is also to be noted from Table II that there is not a large difference between the results at the flow rates shown. It was found that it was best to operate the tube with the packing material at a flow rate of between 80–100 pounds per hour with the heaters spaced about one-quarter inch from the tube 14. This reduced the problems of heat transfer with the tube 14.

As can be seen from Table II and FIGURE III, the amount of phosgene in the bromine from the heated tube 14 increases rapidly at temperatures approaching 1000° F. (FIGURE III shows the curve with the heaters 15 tight against the tube 14.) Further as discussed above, the spacing of the heating rods 15 affected the generation of phosgene. It was found that it was preferred to operate the tube 14 with a packing material at temperatures between about 800° F. to about 1000° F. Without a packing material in the tube 14 it was preferred to operate the tube 14 at temperatures between about 900° F. to 1000° F., with a much lower flow rate because of the reduced heating surface area, as will be discussed hereinafter.

A chlorine analysis was conducted on the bromine from the tube 14 using the infrared adsorption method. It was found that when a temperature range between 700° F. and 1000° F. was used, that the chlorine content was reduced from about 1500 p.p.m. to about 50 p.p.m. or less. At temperatures in excess of about 1000° F. the chlorine was not removed as discussed above.

The product from the heated tube was distilled, washed and dried, as shown in FIGURE I and as discussed above, to produce high purity bromine. It was found in all cases that high purity bromine (99.95 percent plus bromine) was produced which was substantially free from hydrocarbon impurities and which contained only small amounts of brominated and chlorinated carbon materials.

The effect of adding oxygen and air to a heated tube in the presence of the crude bromine was investigated to determine the relationship of the present process to that disclosed in Patent No. 2,929,686 above discussed. Illustrative is the following Comparative Example III.

COMPARATIVE EXAMPLE III

A 2 inch long by 1 inch in diameter quartz (Vycor) tube was heated with a 24 inch long tube furnace. The tube was fitted with a ¼-inch O.D. Pyrex Thermowell which extended fully down into the middle of the quartz tube. The tube was then filled with ¼-inch Intalox saddles (United States Stoneware). A thermocouple was positioned in the thermowell and used to regulate the inside temperature to about 800° F. The quartz tube was mounted vertically on a 500 ml. three-neck flask on a heating mantle. The outlet end of the quartz tube was fitted with a condenser, air vent and receiver.

The unit was operated at a flow rate of about four pounds per hour of bromine through the heated tube. At this flow rate, there was complete elimination of the hydrocarbon impurities in the product from the heated tube. Carbon tetrachloride and bromotrichloromethane were detected in this product in concentrations of less than 20 p.p.m. Trace concentrations (less than 3 p.p.m.) of hydrogen chloride and phosgene were detected in this product by infrared analysis.

The unit was then run under the same conditions except that air was introduced into the 500 ml. flask. The rate of air addition was determined by measuring the output of air at the vent. The rate of air addition was about 500 ml. per minute. At this rate, there was considerable loss of bromine which was swept off by the air through the vent. Analysis of the bromine from the heated tube by infrared showed no significant alteration of the composition of the impurities remaining in the bromine. The experiment was repeated and this time oxygen was added to the system at a rate of about 500 ml. per minute. There was no alteration of the composition of the impurities remaining in the bromine from the heated tube upon infrared analysis.

It was concluded from these and other experiments that operation of a heated tube at temperatures between about 700° F. to about 1000° F. in the presence of air or oxygen did not alter the reaction products and that these temperatures were insufficient for the oxidation of the hydrocarbon impurities in the bromine.

As can be seen from the foregoing examples, particularly Example II, the process of the present invention is highly effective in removing impurities from crude bromine. There are a number of process variables.

An attempt was made to determine the effective bromine flow rate through the heated tube so that complete reaction was achieved. As a result of this work, it is believed that the effective flow rate is a function of the surface area of the heated tube and any packing materials inside the tube. Thus, for instance, the heated tube used in Example II had an effective bromine flow rate of about 13 pounds per hour without any packing materials. The same tube packed with quartz chips achieved an effective flow rate of about 100 pounds per hour. Thus, the use of packing materials in the heated tube is preferred because of the high flow rates obtainable. It is believed that the effective flow rate is directly proportional to the surface area of the heated tube and any packing materials.

The effective flow rate also depended upon the length of the heated tube. The tube was made long enough to insure that all of the bromine was properly heated.

Various packing materials were utilized in the tube. Thus, pyrex rings, Intalox saddles and quartz chips were used as packing materials. In general, it was found that ceramic materials of various kinds could be effectively used as packing materials. Metallic materials can be used as packing materials; however, because of the corrosive attack of the bromine on the metallic materials, they are not preferred.

In the three inch and larger diameter tubes when packing was used, a severe temperature gradient was created between the inner surface of the tube and the center of the tube when using external heating means. It was found that the use of a high temperature on the outside of the tube to get a temperature within the acceptable range in the center of the tube, resulted in increased phosgene generation at the outside of the surface of the tube. This was particularly found to be true when the external heating unit was in closely spaced relation or in contact with the tube as shown in Example II. It was found that it was much preferred to leave a small air space between the outside heating unit and the quartz tube as shown in Example II.

Variations in the tube diameter, length and packing material as well as the heating means and positioning can be easily made by those skilled in the art. It is intended that all of these variations be included within the scope of the present invention.

In the process of Example II it was found that it was preferred to provide an unheated tubular member 13 between the vaporizer 11 and the heated tube 14. This was preferred because of the tendency of the vaporized bromine to severely bump the heated tube 14 when the tubular member 13 was not present. This tubular member 13 provides more gradual introduction of the vaporized bromine into the heated tube 14 by reducing liquid bromine entrainment in the vaporous bromine and is thus preferred.

It will be appreciated that after the bromine has been heated in the heated tube and condensed, it is preferred to separate the bromine from the resulting impurities by distillation. However, other separation means are contemplated within the scope of the present invention.

The other equipment in the preferred process of Example II is conventional as are the techniques employed in the use of this equipment. Thus, variations in the removal of water and hydrogen halides from the bromine after treatment by the heated tube are within the skill of the art and are included within the scope of the present invention.

It was found that the process of the present invention was simple and very economical to operate. Particularly preferred was the utilization of the heated tube as in Example II; however, it will be appreciated that any heated surface can be utilized as shown in Example I. Further, it will be appreciated that the process of the present invention can be conducted as a batch type process; however, the continuous process of the present invention is much preferred.

Under certain circumstances it was desirable to add hydrocarbon materials to the system. This was done to insure that hydrogen bromide would be generated by the reaction of bromine with the hydrocarbon. The hydrogen bromide reacts with chlorine to produce bromine and hydrogen chloride and in this manner chlorine was removed. The hydrocarbon materials added may or may not have a vapor pressure similar to bromine, but are brominated and/or chlorinated by the heating in any event.

Adjustment of the chlorine content of the crude bromine is also contemplated within the scope of the present invention. In this manner, sufficient chlorine is provided in the system to insure that the hydrogen bromide is substantially eliminated.

The high purity bromine produced by the process of the present invention, such as that produced by the process of Example II, has varying amounts of impurities depending upon the impurities in the crude bromine and those introduced during the purification. It has been found that the following impurities shown in Table III occur in the high purity bromine (after distillation) produced by the process of the present invention.

TABLE III

| Impurity: | Concentration of impurity, parts per million |
|---|---|
| Water | 0–30 |
| Carbon dioxide | 0–5 |
| Carbon monoxide | ---- |
| Carbonyl bromide | 0–30 |
| Phosgene | 0–30 |
| Hydrogen chloride | 0–5 |
| Carbon tetrachloride | 0–3 |
| Bromo trichloromethane | 0–30 |
| Sulfuric acid | 0–30 |
| Chlorine | 0–10 |
| Bromine chloride | Less than 50 |

Total maximum about 223 p.p.m.

As can be seen from Table III, the process of the present invention can be used to produce very high purity bromine. The chlorine impurities and/or hydrocarbon impurities are essentially removed. The chlorinated and/or brominated impurities are present at a concentration of about 0–100 p.p.m. depending upon the efficiency of the distillation and the extent of carbonyl bromide or phosgene generation by the heated tube.

The foregoing description is only illustrative of the present invention, and it is intended that this invention be limited only by the hereinafter appended claims.

I claim:
1. The process for the preparation of high purity bromine which consists essentially of:
   (a) heating bromine containing small amounts of chlorine and hydrocarbon materials with vapor pressures similar to bromine at a temperature between about 700° F. to 1000° F. to produce high boiling impurities and hydrogen chloride in the bromine, sufficient chlorine being provided in the bromine to react with substantially all of the hydrogen bromide generated by the heating of the hydrocarbon materials with bromine; and
   (b) separating the bromine from the hydrogen chloride and high boiling impurities to produce high purity bromine.

2. The process of claim 1 wherein the hydrogen chloride is removed by water washing and where the bromine is distilled from the high boiling impurities.

3. The process for the preparation of high purity bromine which consists essentially of:
   (a) continuously passing crude bromine containing a small amount of hydrocarbon impurities with vapor pressures similar to bromine and containing chlorine over a heated surface such that the crude bromine is heated at a temperature of between about 700° F. to 1000° F. to produce high boiling impurities and hydrogen chloride, sufficient chlorine being provided in the crude bromine to react with substantially all of the hydrogen bromide generated by the heating of the hydrocarbon impurities with bromine; and (b) separating the bromine from the hydrogen chloride and high boiling impurities to produce high purity bromine.

4. The process of claim 3 wherein the bromine is passed over the heated surface by being passed through a heated tube containing a packing material.

5. In a process for the preparation of high purity bromine the steps which consists essentially of:

(a) heating bromine containing hydrocarbon materials and chlorine at between that temperature, about 700° F., which causes the hydrocarbon materials to react with bromine and chlorine to form hydrogen chloride and hydrogen bromide and that temperature, about 1000° F., below which hydrogen bromide will react with chlorine to form hydrogen chloride, sufficient chlorine being provided in the bromine to react with substantially all of the hydrogen bromide generated by the heating of the hydrocarbon materials with bromine, thereby substantially eliminating the hydrocarbon materials and producing brominated and chlorinated carbon impurities and hydrogen chloride; and (b) separating the thus produced impurities and hydrogen chloride from the bromine.

References Cited by the Examiner

UNITED STATES PATENTS

| | | |
|---|---|---|
| 2,929,686 | 3/1960 | Codell et al. _____ 23—216 |
| 3,145,084 | 8/1964 | Belohlav _____ 23—218 X |
| 3,233,972 | 2/1966 | Walker et al. _____ 23—218 |

FOREIGN PATENTS

| | | |
|---|---|---|
| 652,460 | 4/1951 | Great Britain. |
| 998,681 | 7/1965 | Great Britain. |
| 135,471 | 1961 | Russia. |

OSCAR R. VERTIZ, *Primary Examiner.*

EDWARD STERN, *Examiner.*